US012209555B2

(12) United States Patent
Vadipour

(10) Patent No.: US 12,209,555 B2
(45) Date of Patent: Jan. 28, 2025

(54) PROPULSION SYSTEMS AND VEHICLES USING THE SAME

(71) Applicant: Morteza Vadipour, Woodland Hills, CA (US)

(72) Inventor: Morteza Vadipour, Woodland Hills, CA (US)

(*) Notice: Subject to any disclaimer, the term of this patent is extended or adjusted under 35 U.S.C. 154(b) by 0 days.

(21) Appl. No.: 18/639,822

(22) Filed: Apr. 18, 2024

(65) Prior Publication Data

US 2024/0280066 A1  Aug. 22, 2024

Related U.S. Application Data

(63) Continuation of application No. PCT/US2022/048468, filed on Oct. 31, 2022.

(60) Provisional application No. 63/354,819, filed on Jun. 23, 2022.

(51) Int. Cl.
*B64D 27/30* (2024.01)
*B64C 29/00* (2006.01)
*F02K 1/78* (2006.01)
*F02K 5/00* (2006.01)

(52) U.S. Cl.
CPC ............... *F02K 1/78* (2013.01); *F02K 5/00* (2013.01); *B64C 29/0008* (2013.01); *B64D 27/30* (2024.01)

(58) Field of Classification Search
CPC .................................. B64D 27/30; B64D 27/32
See application file for complete search history.

(56) References Cited

U.S. PATENT DOCUMENTS

| 2,777,649 | A | 1/1957 | Williams |
| 5,039,031 | A * | 8/1991 | Valverde ............... B64C 39/06 244/12.3 |
| 6,081,059 | A | 6/2000 | Hsu |
| 6,308,912 | B1 | 10/2001 | Kirjavainen |
| 6,976,653 | B2 | 12/2005 | Perlo et al. |
| 7,032,859 | B2 | 4/2006 | Mohr |
| 7,604,198 | B2 | 10/2009 | Petersen |
| 8,146,854 | B2 | 4/2012 | Lawrence |

(Continued)

FOREIGN PATENT DOCUMENTS

| EP | 3239047 B1 | 9/2021 |
| GB | 2365392 A | 2/2002 |

(Continued)

OTHER PUBLICATIONS

Rodriquez, Kari; ISR of PCT/US 22/48468; Dec. 28, 2023; WIPO.
Ellis, Christopher P; International Preliminary Report On Patentability of PCT/US 22/48468; Mar. 25, 2024; WIPO.

*Primary Examiner* — Christopher P Ellis
(74) *Attorney, Agent, or Firm* — The Law Office of Austin Bonderer, PC; Austin Bonderer

(57) ABSTRACT

A peripheral propulsion system having a propulsion unit, an upper section, and a lower section. The propulsion unit has a motor, a motor engagement section, an extension coupled to the motor engagement section, and two or more blades coupled to the extension. The extension is located between the upper section and the lower section. The output section is located about at least a portion of the lower section, and the two or more blades are located outside a periphery of the vehicle. When the motor is running, the two or more blades are capable of drawing fluid from about the periphery of the vehicle and through the output section.

37 Claims, 14 Drawing Sheets

(56) References Cited

U.S. PATENT DOCUMENTS

| | | | |
|---|---|---|---|
| 8,272,593 B2 | 9/2012 | Choi | |
| 8,727,266 B2 | 5/2014 | Cardozo | |
| 8,979,016 B2* | 3/2015 | Hayden, III | B64C 27/46 |
| | | | 244/17.11 |
| 9,555,879 B1 | 1/2017 | Kaiser | |
| 9,840,323 B1 | 12/2017 | Kaiser | |
| 9,862,486 B2 | 1/2018 | Delorean | |
| 9,896,196 B1* | 2/2018 | Kaiser | B64D 27/20 |
| 10,315,759 B2 | 6/2019 | Nemovi et al. | |
| 10,343,771 B1* | 7/2019 | Kaiser | B64C 25/06 |
| 10,479,489 B2 | 11/2019 | Bertels | |
| 10,669,019 B2 | 6/2020 | Kaiser | |
| 10,954,792 B2* | 3/2021 | Lugg | F01D 5/02 |
| 10,988,247 B2 | 4/2021 | Iskrev et al. | |
| 11,161,608 B2 | 11/2021 | Namgoong et al. | |
| 11,292,588 B1 | 4/2022 | Pope | |
| 2005/0127239 A1* | 6/2005 | Srivastava | B64C 27/20 |
| | | | 244/12.2 |
| 2011/0163198 A1* | 7/2011 | Leaver | B64C 31/032 |
| | | | 244/12.1 |
| 2016/0368597 A1 | 12/2016 | Medlock | |
| 2018/0072408 A9 | 3/2018 | Medlock | |
| 2019/0185155 A1 | 6/2019 | Delorean | |
| 2020/0070989 A1* | 3/2020 | Harvey | B64D 27/24 |
| 2020/0122827 A1 | 4/2020 | Nemovi et al. | |
| 2020/0224547 A1* | 7/2020 | Chong | H02K 21/14 |
| 2020/0283136 A1 | 9/2020 | Nguyen et al. | |
| 2020/0407078 A1 | 12/2020 | Shimamoto et al. | |
| 2021/0036580 A1 | 2/2021 | Cottrell | |
| 2021/0053672 A1 | 2/2021 | Villabrille Prades | |
| 2021/0171209 A1 | 6/2021 | Hines | |
| 2021/0339853 A1 | 11/2021 | Blinkov et al. | |
| 2021/0362848 A1 | 11/2021 | Spencer | |
| 2022/0048617 A1 | 2/2022 | Shima et al. | |
| 2023/0012160 A1* | 1/2023 | Opalinski | B63H 1/16 |
| 2023/0348088 A1* | 11/2023 | Besse | B64C 11/28 |
| 2024/0068557 A1* | 2/2024 | Ciciriello | F16H 1/28 |
| 2024/0113588 A1* | 4/2024 | Yazaki | H02K 1/32 |
| 2024/0178731 A1* | 5/2024 | Radzikh | F02K 5/00 |
| 2024/0204617 A1* | 6/2024 | Lee | H02K 7/083 |
| 2024/0250585 A1* | 7/2024 | Nehme | H02K 21/16 |

FOREIGN PATENT DOCUMENTS

| | | | | |
|---|---|---|---|---|
| GB | 2460441 A | * | 12/2009 | B64C 27/10 |
| JP | 2011521833 A | | 7/2011 | |
| JP | 5666431 B2 | | 2/2015 | |
| WO | 2023249652 | | 12/2003 | |
| WO | 2009144477 A2 | | 12/2009 | |

* cited by examiner

FIG. 3D
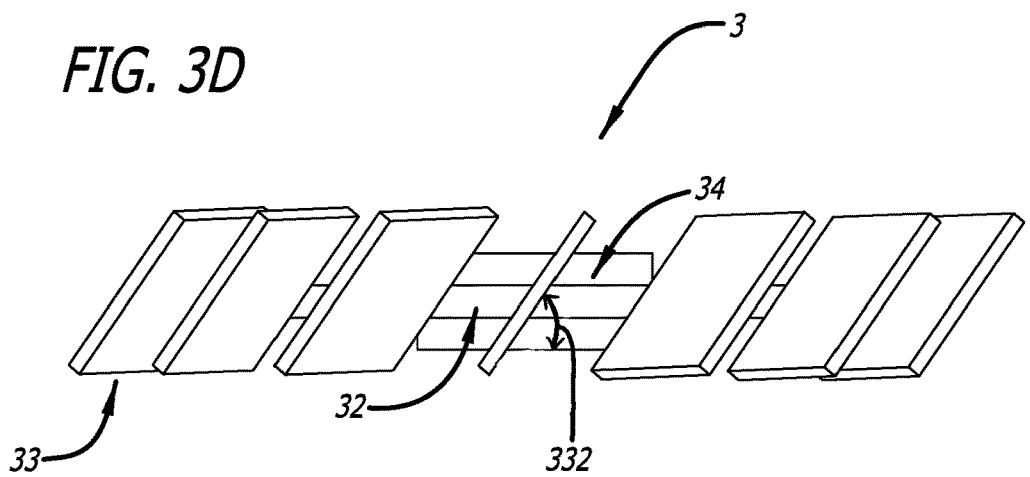
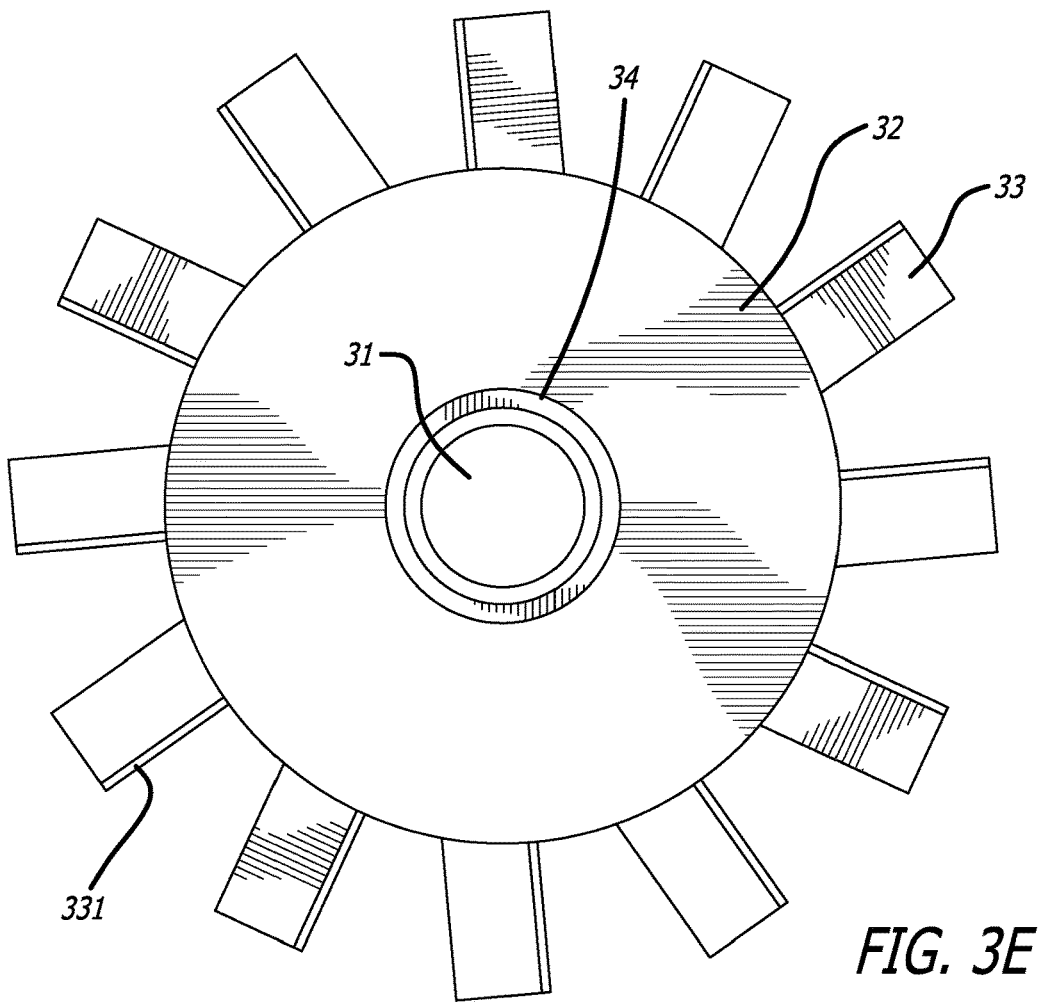
FIG. 3E

FIG. 4A
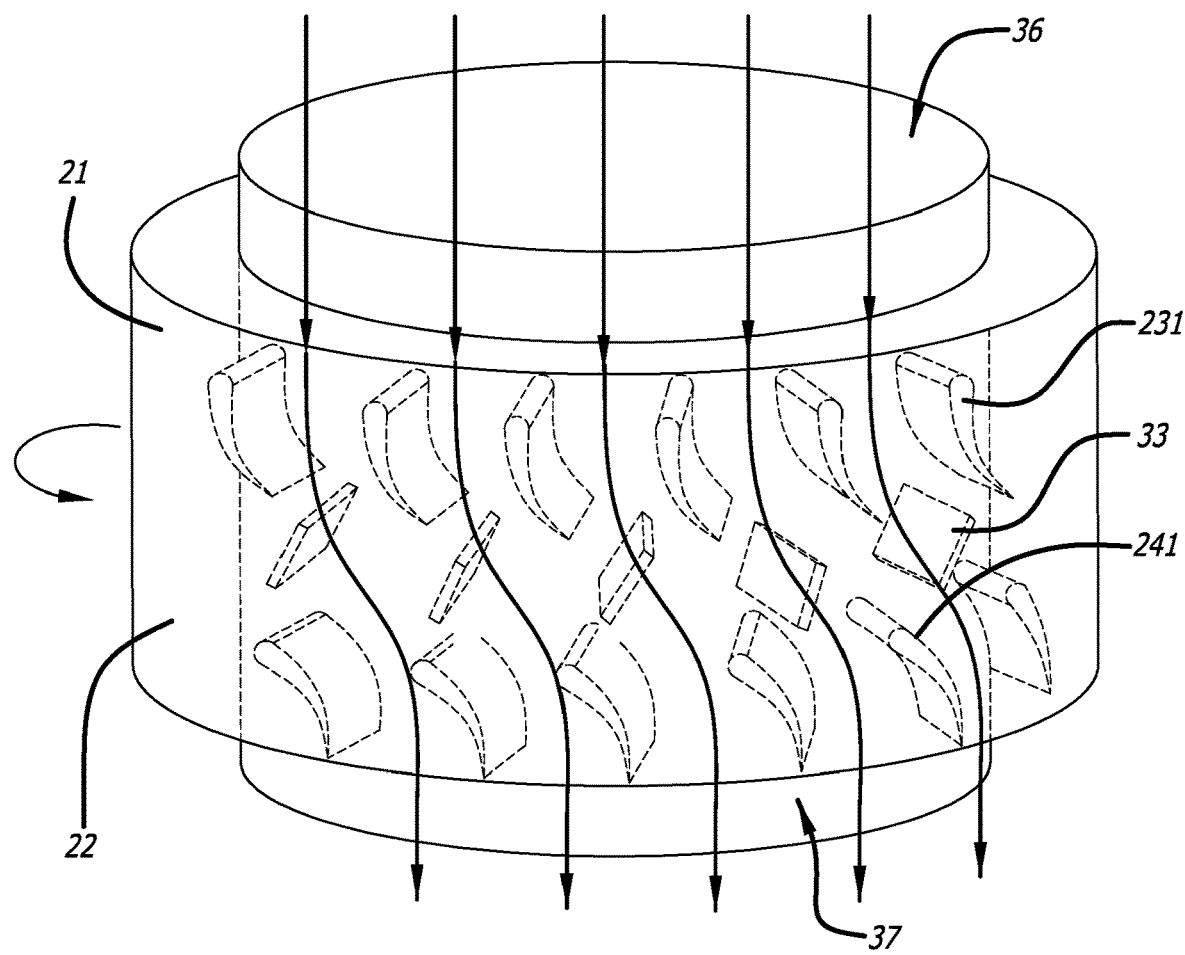
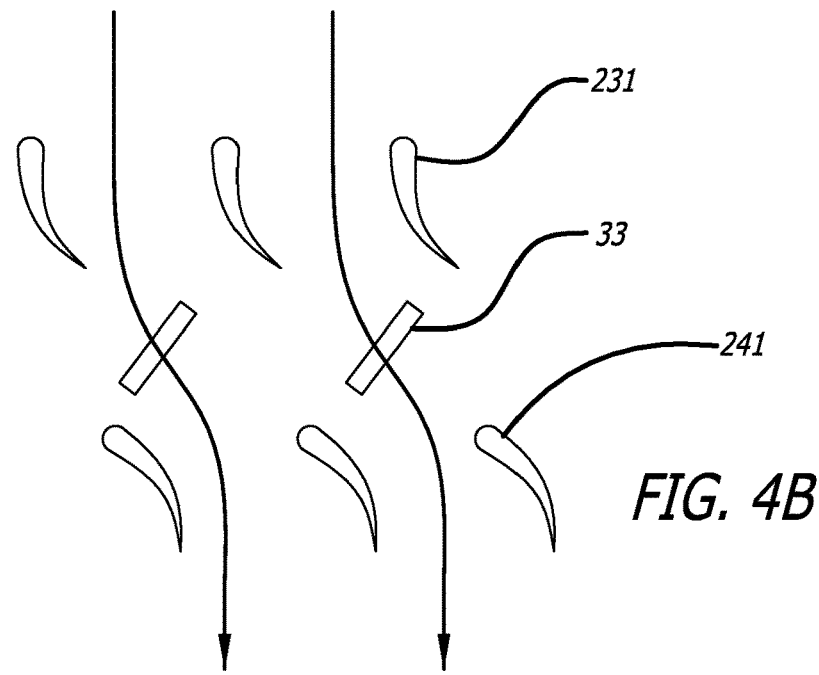
FIG. 4B

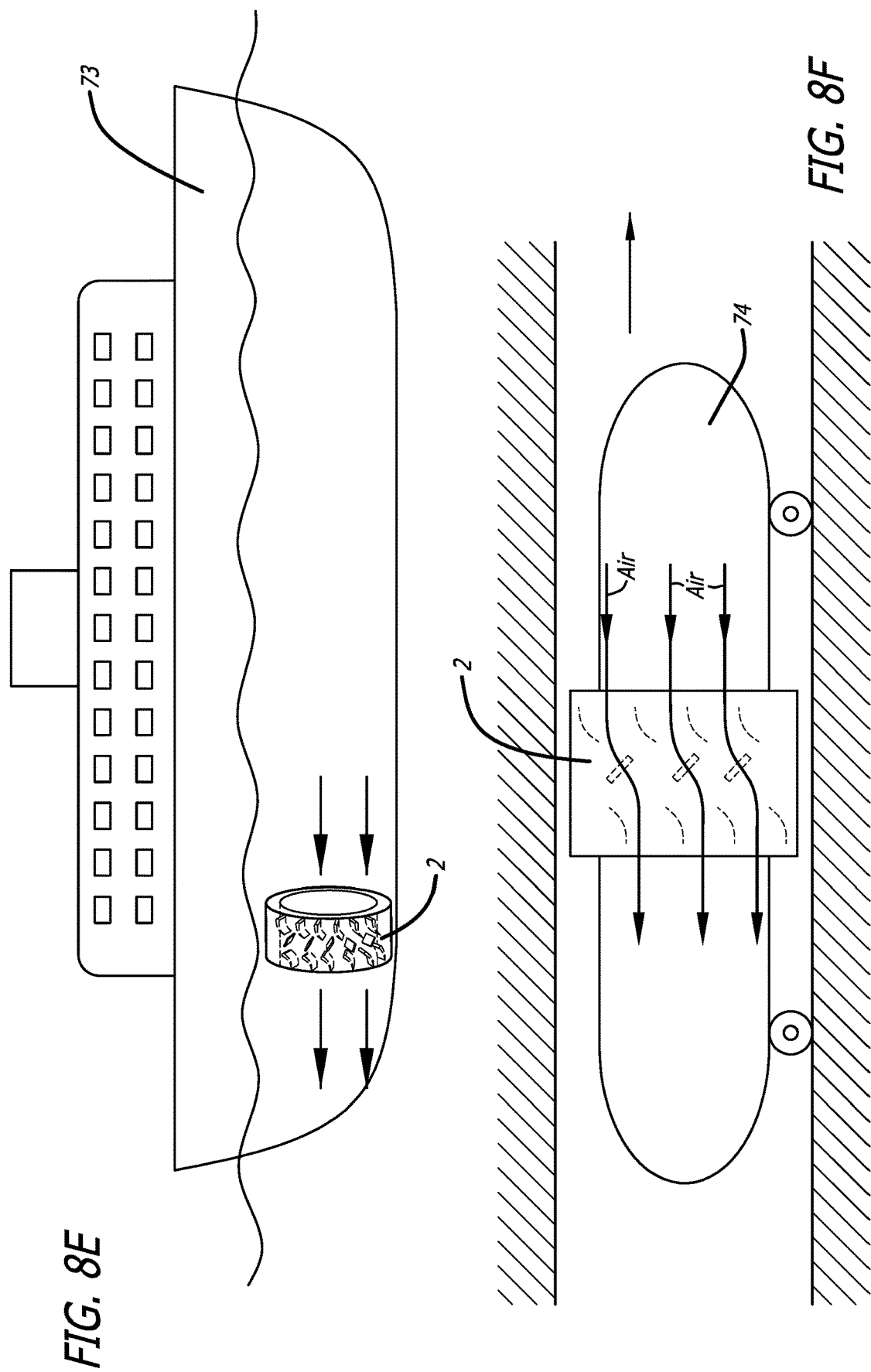

PROPULSION SYSTEMS AND VEHICLES USING THE SAME

FIELD

The subject matter herein generally relates to a propulsion system.

BRIEF DESCRIPTION OF THE DRAWINGS

Implementations of the present technology will now be described, by way of example only, with reference to the attached figures, wherein:

FIG. 3D shows an embodiment of the propulsion unit.

FIG. 3E shows an embodiment of the propulsion unit.

FIG. 4A shows an embodiment of the PPS.

FIG. 4B shows a representation of an embodiment of the PPS with an embodiment of the intake vanes and an embodiment of the output vanes.

FIG. 8E shows an embodiment of a watercraft with an embodiment of a PPS.

FIG. 8F shows an embodiment of an enclosed transport system with an embodiment of a PPS.

DETAILED DESCRIPTION

Figure 1:
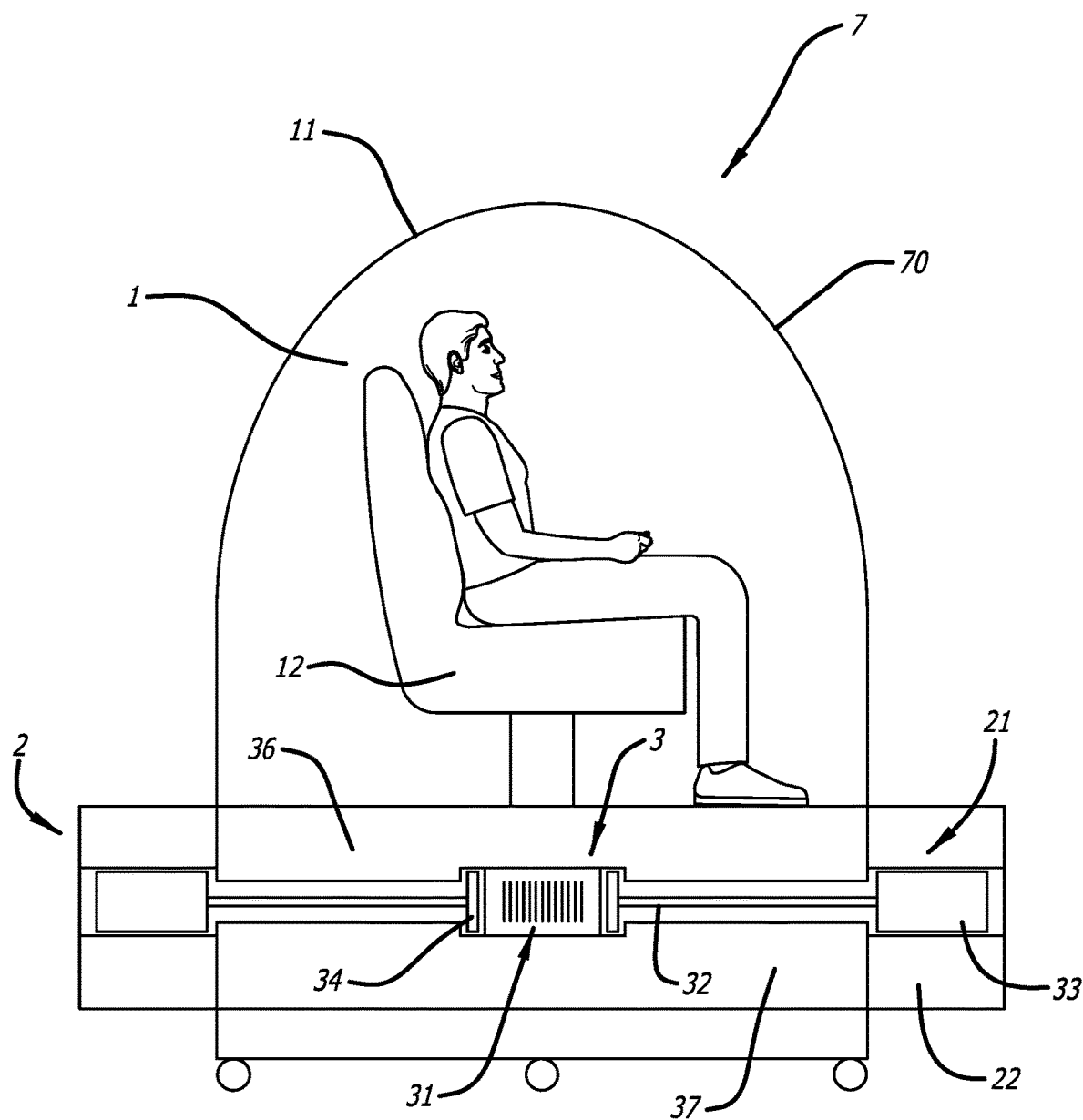
FIG. 1 shows an embodiment of a Vertical Take Off and Landing vehicle (VTOL) using an embodiment of the Peripheral Propulsion System (PPS).

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein. It should be noted that references to "an embodiment," "one embodiment," or "some embodiments" in this disclosure are not necessarily to the same embodiment, and such references mean at least one.

Several definitions that apply throughout this disclosure will now be presented.

The term "coupled" is defined as connected, whether integral with, directly attached, or indirectly attached through intervening components, and is not necessarily limited to physical connections. The connection can be such that the objects are permanently connected or releasably connected. The term "electrically coupled" is defined as being in structural electrical contact, whether directly or indirectly through intervening components, to allow the flow of electrons between the respective elements. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "about" in relation to quantitative measurements (unless otherwise stated) includes, but is not limited to, the disclosed measure and measurements about the disclosed measure in terms of its disclosed degree. For example, "about 90" would at least include 80-100, whereas "about 90.0" would at least include 89.0-91.0. The term "comprising" means "including, but not necessarily limited to"; it specifically indicates open-ended inclusion or membership in a so-described combination, group, series, and the like.

The present disclosure is described primarily in relation to a vehicle 7 that is a VTOL 70; however, as indicated, the PPS 2 can be used in any appropriate environment. As shown, it is contemplated for use with other vehicles 7 such as aircraft 71, watercraft 73, submarine 72, and an enclosed transport vehicle 74, e.g., vactrain and hyperloop.

FIG. 1 illustrates an embodiment of the VTOL 70. The VTOL 70 comprises a personnel section 1 and a PPS 2.

In some embodiments, the personnel section 1 comprises one or more of the following: a cover 11, a chair 12, and flight controls (not shown). In some embodiments, a personnel section 1 is housed in a separate module coupled to and electrically coupled to the PPS 2. Cockpit noise isolation can be achieved, in part due to the location of the PPS 2, compared to traditional helicopters, where propellers are overhead, and the engine is next to the passenger. Passive noise reduction techniques such as double-paned glasses and active noise cancellation can also be used. In some embodiments, the personnel section 1 floor could be made of sound-absorbing material to reduce noise during lift-off and landing. The VTOL 70, with its minimalistic footprint, would be ideal to land in smaller places such as yards, parking lots, flat roofs, etc.

In some embodiments, the PPS 2 comprises an intake section 21, an output section 22, and a propulsion unit 3. In some embodiments, the propulsion unit 3 comprises a motor 31 and a propulsion member. In some embodiments, the propulsion member comprises an extension 32 and blades 33. In some embodiments, the propulsion member comprises a motor engagement section 34 that has a length greater than the extension 32 to increase the engagement of the motor 31 while still decreasing the weight of the extension 32. In some embodiments, the motor 31 comprises a stator of an electric motor, and the motor engagement section 34 acts as, or is, the external rotor of an electric motor. The blades 33 are configured to draw in and push out fluid into and out of the PPS 2. In some embodiments, the propulsion unit 3 comprises an upper section 36 and a lower section 37. In some embodiments, the motor 31 and the propulsion member are located between the upper section 36 and the lower section 37. In some embodiments, the personnel section 1 is coupled to the upper section 36. In some embodiments, the upper section 36 is at least partially coupled to lower section 37 by the intake section 21 and/or the output section 22. In some embodiments, the upper section 36 and/or the lower section 37 have outer walls that are substantially or fully solid such that fluid flow primarily or fully flows through the openings at the top and bottom thereof.

In some embodiments, the blades 33 rotate about or outside the periphery of the personnel section 1. It is believed that having the PPS 2 below and the blades 33 and fluid flow outside the periphery enhances aerodynamic and/or rideability effects because the active air thrust is out along the periphery.

In some embodiments, the motor 31 is coupled to or an integral part of the lower section 37 and acts to support or partially support the upper section 36. In some embodiments, the motor 31 comprises an electric motor, an internal combustion motor, or a combination thereof.

Figure 2A:
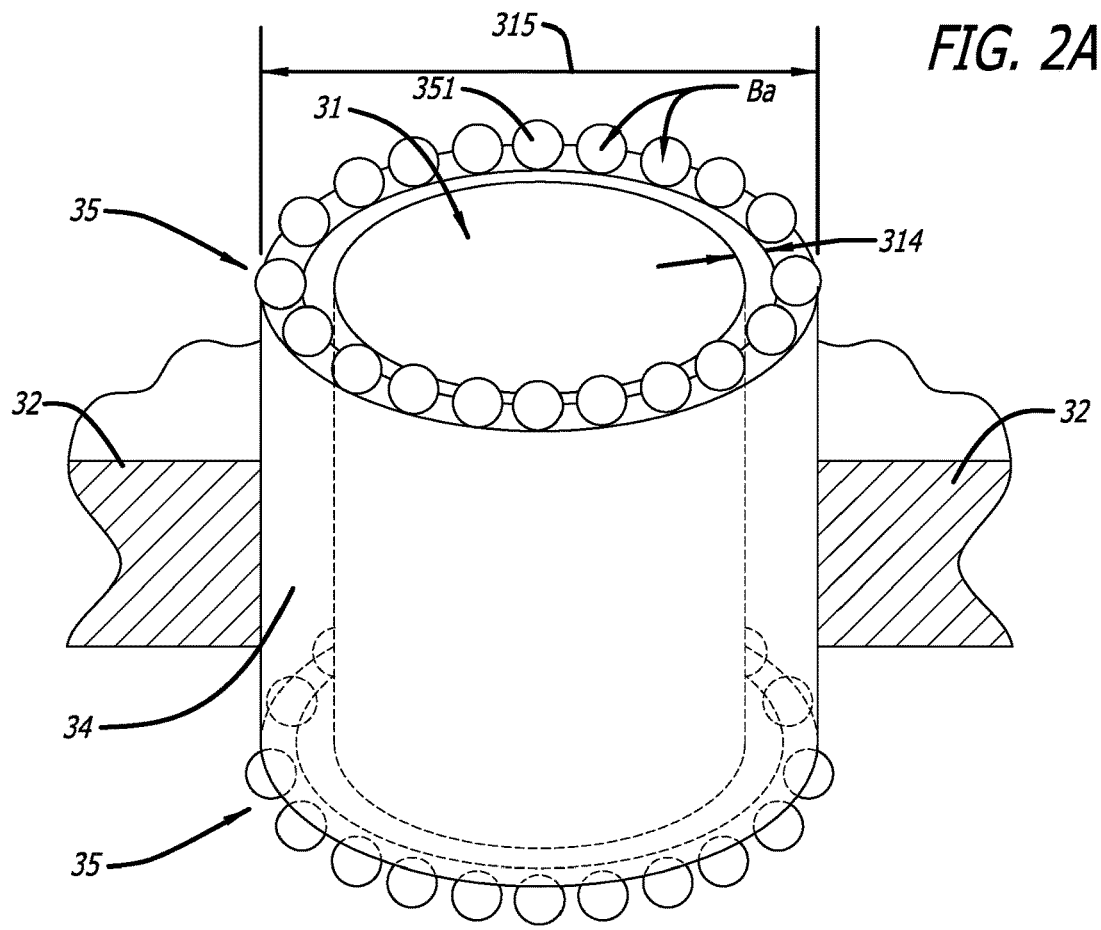
FIG. 2A shows an embodiment of a motor.

FIG. 2A illustrates an embodiment of the motor 31 and the motor engagement section 34. In some embodiments, there is an air gap 314 between the motor 31 and the motor engagement section 34. In some embodiments, the air gap 314 is consistent about the motor 31. In some embodiments, the motor engagement section 34 rotates about the motor 31. In some embodiments, there is a bearing 35 located between one or both (upper and lower bearing), the motor engagement section 34 and the upper section 36, and the motor engagement section 34 and the lower section 37. In some embodiments, the one or more of the bearings 35 comprises balls 351.

The diameter 315 of the motor engagement section 34 can be set to achieve optimum performance. In some embodiments, too small a diameter would have difficulty supporting the weight of the upper section 36 and the personnel section 1 during the flight, while too large a diameter would create impractically ultra-fast spinning ball bearings, causing severe friction loss and destruction. Currently, there is no ball-bearing technology to operate on the periphery of the propulsion unit 3, at the required speeds, in the weight and the size suitable for a VTOL 70 able to carry a passenger. In contrast, in some embodiments of the current design, by using the extension 32, the bearing 35 can reduce its required speed and lessen friction. In some embodiments, the diameter 315 of the motor engagement section 34 is about 50 cm and in some embodiments the diameter 315 is less than 50 cm. In some embodiments, the balls 351 can be roll-bearings, which, in some embodiments, can provide better lift handling.

In some embodiments, the motor 31 comprises stator of an electric motor, and the motor engagement section 34 is the external rotor of the electric motor. In some embodiments, the balls 351 are located on both ends of the motor engagement section 34, and the air gap 314 is well-defined and constant to create the required stator-rotor separation. The direct engagement of the balls 351 with the motor engagement section 34 and when the motor engagement section 34 is the external rotor of the electric motor can allow for efficiencies that allow for better power consumption. Designs of the prior art may use traditional ball bearings to secure the rotor to a motor shaft and use thrust bearings to couple the shaft to the body. In some embodiments, given that there is no need for traditional ball bearings, the weight and/or friction is reduced, resulting in greater efficiency.

Figure 2B:
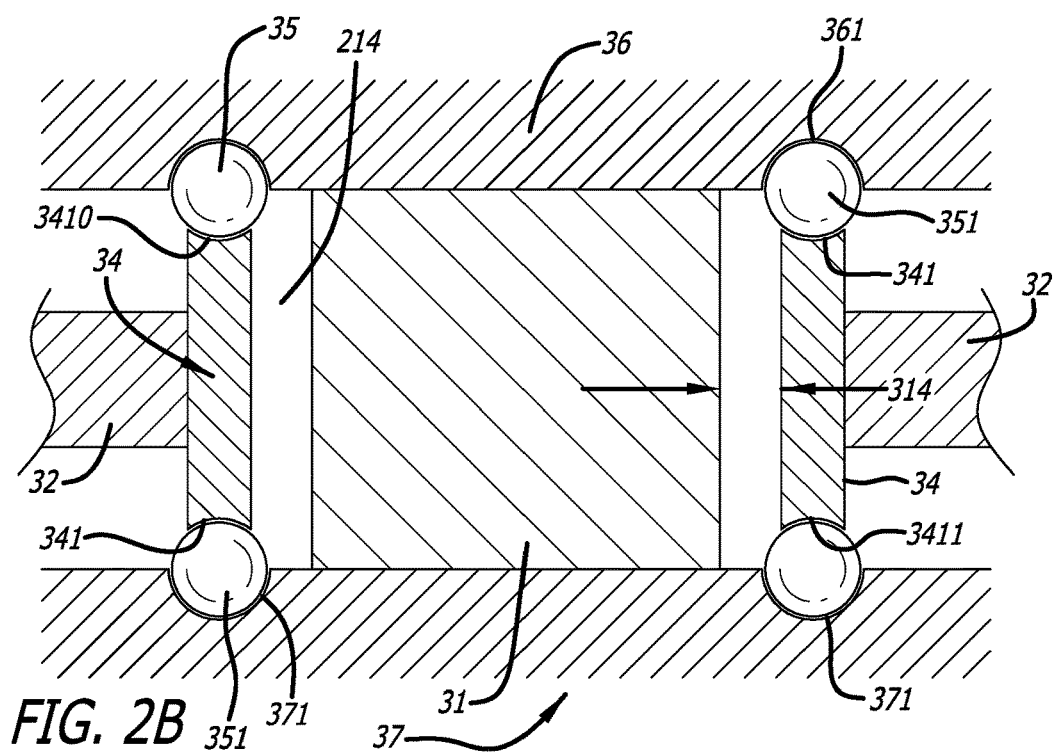
FIG. 2B shows an embodiment of a motor.

FIG. 2B illustrates an embodiment of the motor 31 and the motor engagement section 34. In some embodiments, the motor engagement section 34 defines one or more ball grooves 341. In some embodiments, the ball grooves 341 comprise of an upper ball groove 3410 and the lower ball groove 3411. In some embodiments, the upper section 36 defines an upper section groove 361 and the balls 351 at least partially reside inside the spaces defined by the upper ball groove 3410 and the upper section groove 361. In some embodiments, the lower section 37 defines a lower section groove 371 and the balls 351 at least partially reside inside the spaces defined by the lower ball groove 3411 and the lower section groove 371. The bearings 35 allow for low friction movement between motor engagement section 34 and the upper section 36 and/or the lower section 37. Also in some embodiments, the motor engagement section 34, and the extension 32, the blades 33, or a combination thereof can be integral.

Figure 2C:
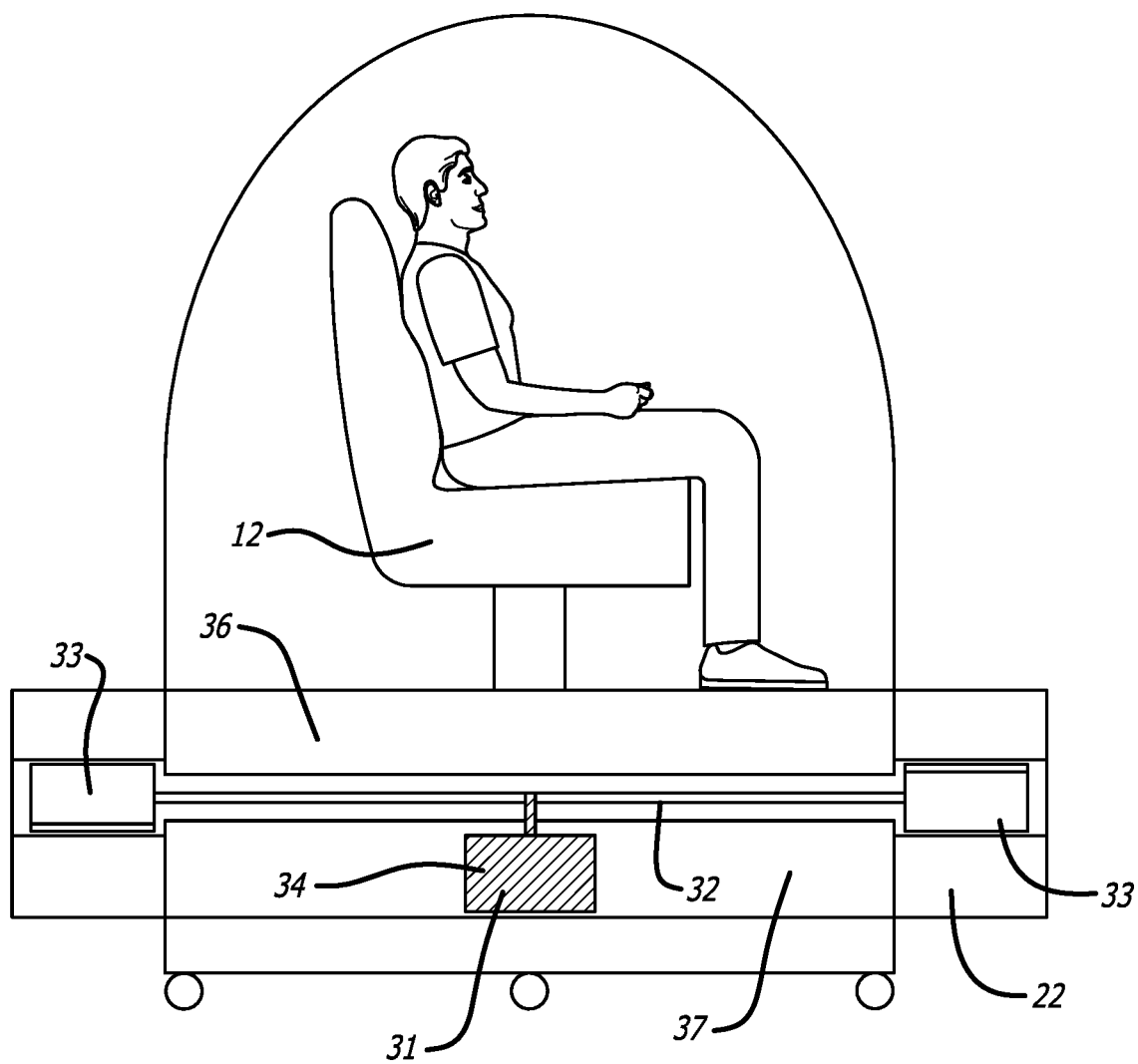
FIG. 2C shows an embodiment of a VTOL using an embodiment of the PPS.

FIG. 2C illustrates an embodiment of the PPS 2 comprising a motor 31 located in the lower section 37. In some embodiments, the motor engagement section 34 extends from the motor 31, is coupled to or integral with the extension 32, and the extension 32 is coupled to or integral with the blades 33. In some embodiments, the motor 31 is a stator and the motor engagement section 34 is a rotor. While it is shown in FIG. 1B that the motor 31 is located in the lower section 37, it is to be understood that the orientation can be flipped such that the motor 31 is located in the upper section 36 and the motor engagement section 34 extends down from the motor 31.

Figure 3A:
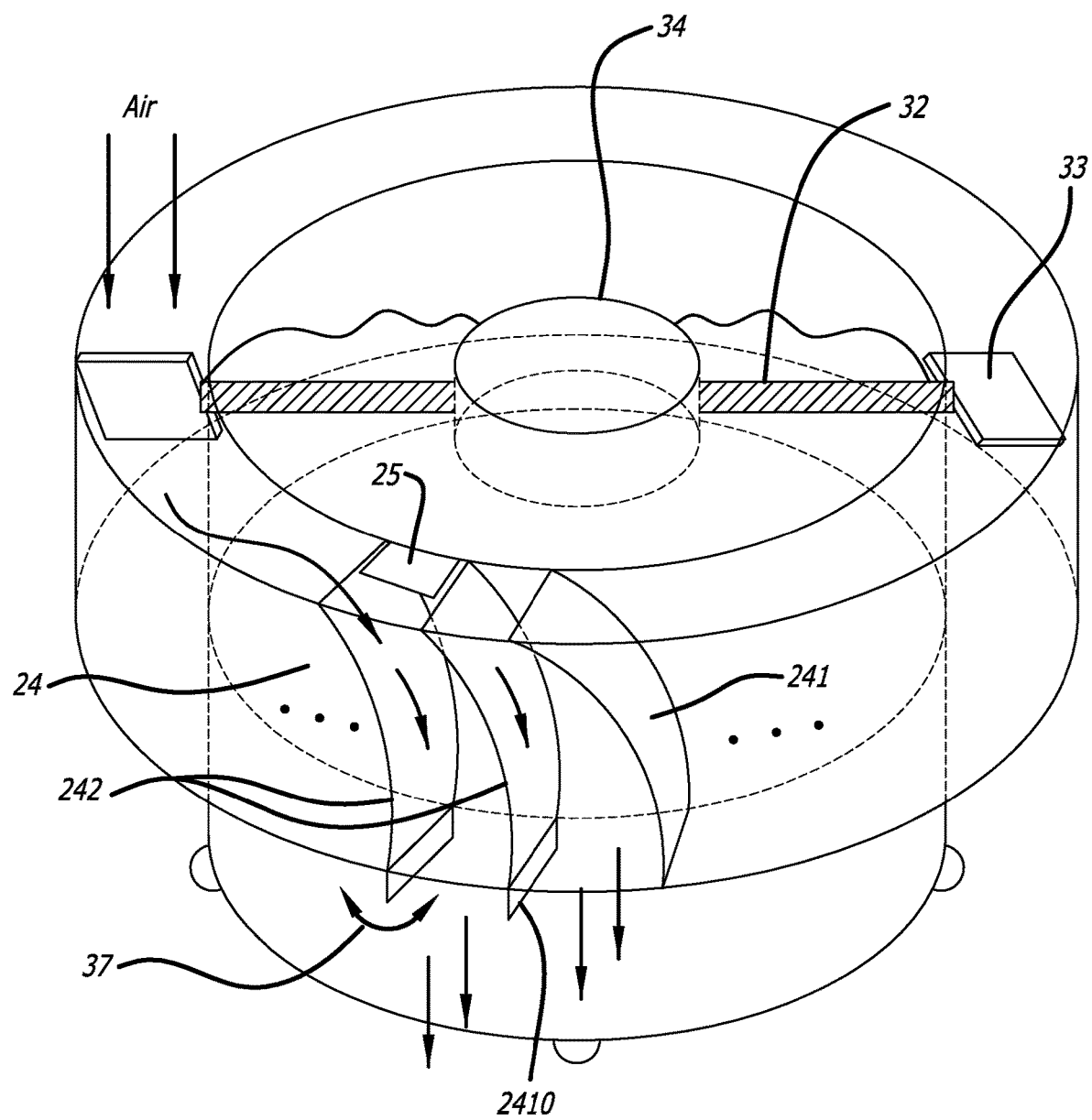
FIG. 3A shows an embodiment of the output section.

FIG. 3A illustrates an embodiment of the output section 22. In some embodiments, the output section 22 acts to provide for the reduction of torque or torque-free operation of the propulsion unit 3. In some embodiments, the output section 22 comprises a flow guide 24. In some embodiments, the flow guide 24 comprises one or more output vanes 241. In some embodiments, the output vanes 241 define internally curved surfaces that absorb the rotational momentum of the exiting air created by blades 33 and directs the fluid straight out of the output section 22. This effectively cancels the exiting fluid torque and produces a uniform outward thrust. In some embodiments, the angle, curvature, thickness of the blades 33, or a combination thereof can be changed. In some embodiments, the output vanes 241 extend the majority of the, if not the entire, length of the flow guide 24.

In some embodiments, the output section 22 comprises three or more output throttles 25. In some embodiments, the one or more of the throttle vanes 242 comprise output vane vectoring elements 2410, or also called throttle vane vectoring elements. In some embodiments, the output vanes 241 comprise throttle vanes 242 that have an output throttle 25 controlling the flow of fluid therebetween. In some embodiments, the output vanes 241 comprise an output vane vectoring elements 2410 configured to at least partially direct fluid flow out the output section 22.

In some embodiments, the extension 32 comprises a spoke configuration comprising two or more arms extending from the motor engagement section 34 with a blade 33 on the end. The motor engagement section 34 will rotate, which will cause the blades 33 to move and force fluid into the output section 22 and through the output vanes 241, output throttles 25, and/or the throttle vanes 242. In some embodiments, output throttles 25 extend, horizontally, in and out from the lower section 37 to adjust air flow. In some embodiments, the output throttles 25 are located below the throttle vanes 242 and/or are configured to extend in and out from the lower section 37.

In some embodiments, due to the peripheral structure of the PPS 2, the blade angle 332 of the blades 33 can stay constant and does not change radially, so the resultant downward flow is vortex-free and uniform, allowing better torque cancellation. In some embodiments, the blades 33 are able to rotate according to need, and one or all the vanes, as a set or individually, are able to rotate in order to increase torque cancelation. Further, the output vanes 241 need to be of sufficient length to be effective and provide a smooth downward fluid flow transition. In some embodiments, the curvature and/or the combination of the length and the curvature of the output vanes 241 are arranged such that no fluid could travel straight through the output section 22 without altering its path. In some embodiments, one would not be able to see straight through the output section 22 due to the shape and location of the output vanes 241.

Figure 3B:
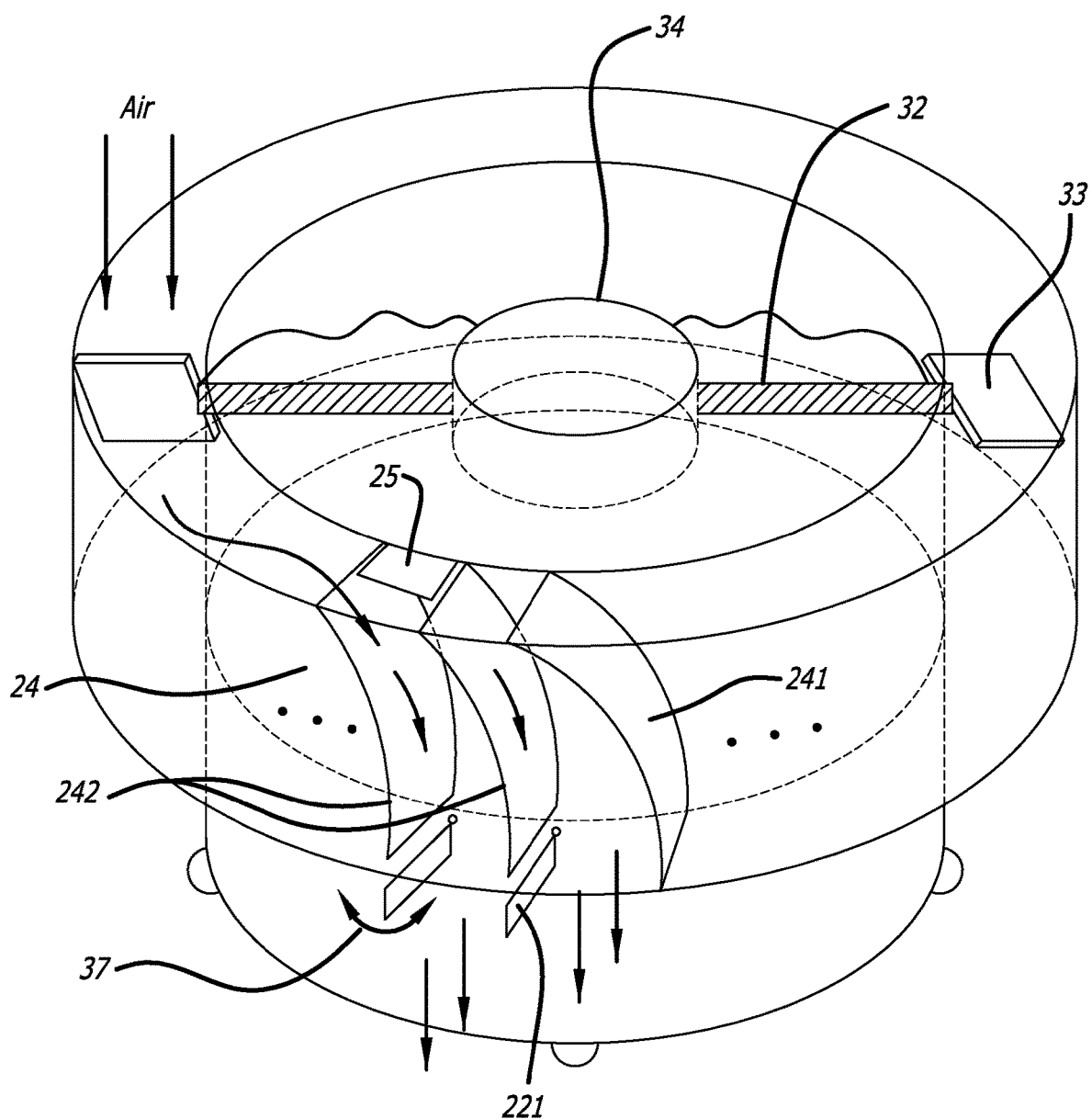
FIG. 3B Shows an embodiment of the output section comprising output section vanes.

FIG. 3B illustrates an embodiment of the output section 22 comprising output section vectoring elements 221. It is to be understood, that the output section vectoring elements 221 may line up with the output vanes 241 or be offset therefrom. The number and location of the output section vectoring elements 221 is not limited. In use the output section vectoring elements 221 can work independently, all together, or in different groups. In some embodiments, output throttle 25 resides in a different vane than output section vectoring element 221. Output vane vectoring element 2410 achieves the same task as output vane vectoring element 2410. In some embodiments, there will be both output section vectoring elements 221 and output vane vectoring elements 2410, and in some embodiments, the output section vectoring elements 221 and the output vane vectoring elements 2410 can be aligned with the same output vane 241. In some embodiments, there are output section vectoring elements 221, output vane vectoring elements 2410, intake vane vectoring elements, blade vectoring elements 331, or a combination thereof.

Figure 3C:
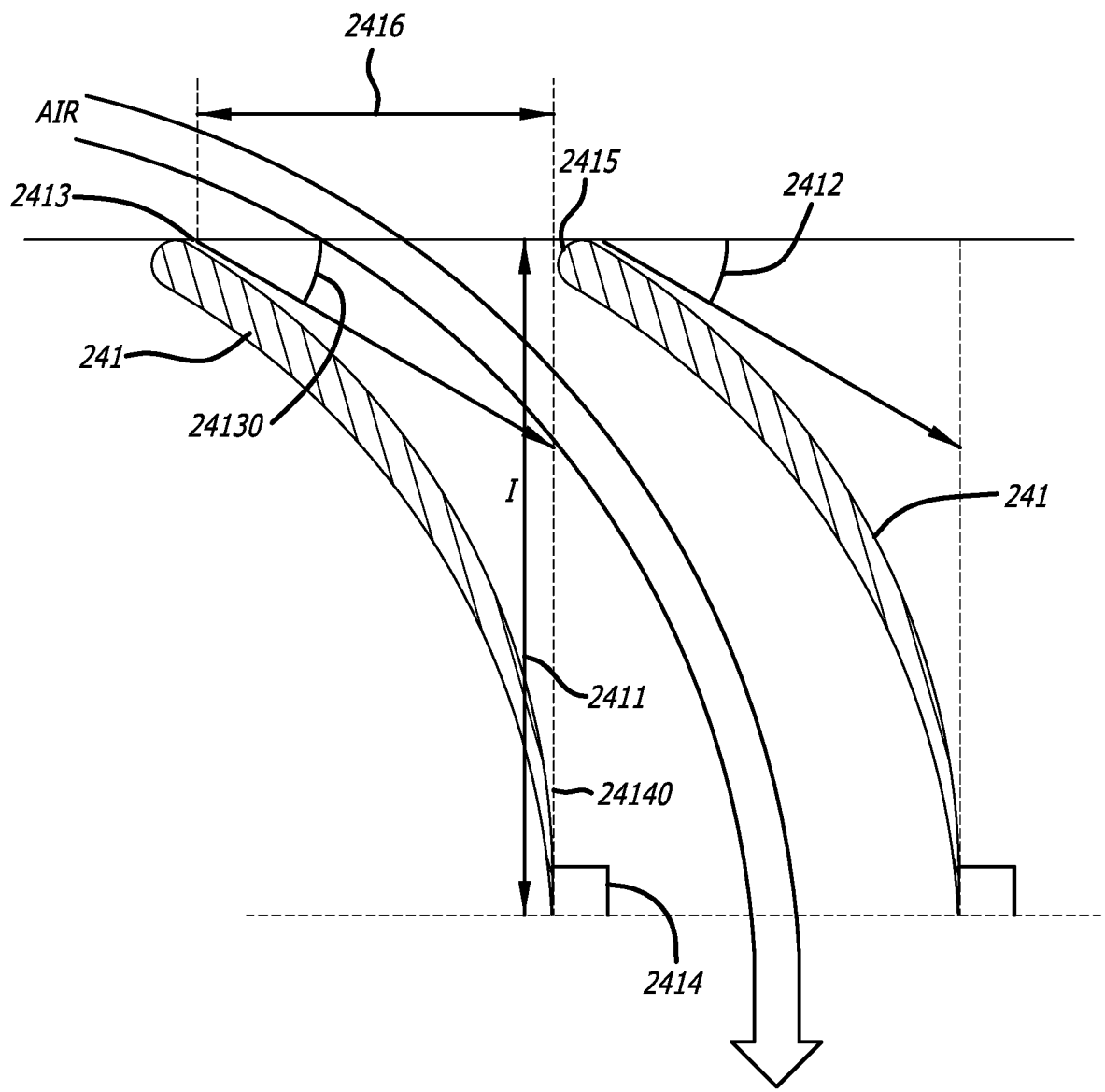
FIG. 3C shows an embodiment of the output vanes in an embodiment of the output section.

FIG. 3C illustrates an embodiment of the output vanes 241 define a trailing distance 2411. In some embodiments, the trailing distance 2411 is defined by the distance between the trailing input edge 2413 and the trailing output edge 2414 of an output vane 241. In some embodiments, the trialing distance is greater than or equal to the distance between the trailing input edge 2413 and the leading input edge 2415 of an adjacent output vane 241. In some embodiments, the trailing distance 2411 and the location of the leading input edge 2415 of an adjacent output vane 241 are situated such that there is no way for fluid to flow straight through the output section 22. The fluid will have to alter its course to some degree as it flows through the output vanes 241. There is a trailing edge tangent 24140 that is the tangent of the trailing output edge 2414, and in some embodiments, the trailing edge tangent 24140 is set to, or about, 90 degrees in relation to the output plane. There is also a trailing input edge tangent 24130 that is the tangent of the trailing input edge 2413, and in some embodiments, the trailing input edge tangent 24130 is set to, or about, 45 degrees in relation to the intake plane. In some embodiments, the output vanes 241 defines a shape where the output vane 241 near the entry is thicker than it is at the output. In some embodiments, the output vanes 241 are substantially a curved tear-drop shape. In some embodiments, the total height of the output vane 241 is, or about, two times the effective length 2416 of the output vanes 241. In some embodiments, the ability of the output throttle 25 to limit flow between the throttle vanes 242 can be set as desired. As can be seen in FIG. 3B, in some embodiments, the output throttle 25, when extended, only covers a portion of the entry. In some embodiments, the output throttle 25 covers a majority, if not all of the entry when fully extended (e.g., anything between 50% to 100%).

As indicated below, in some embodiments the intake vanes 231 are a reflection, or substantially a reflection of, the output vanes 241. In some embodiments, the intake vanes 231 comprise an intake trailing input edge and an intake trailing output edge. The intake trailing input edge defines an intake trailing input edge tangent, and the intake trailing output edge defines an intake trailing output edge tangent. Each intake vane 231 defines an effective length. In some embodiments the intake trailing input edge tangent is about 90 degrees, the intake trialing output edge tangent is about 45 degrees, or a combination thereof. In some embodiments, each intake vane 231 comprises a leading input edge; and a distance between trialing input edge and the leading input edge of an adjacent output vane is less than or equal to the effective length.

FIG. 3D illustrates a representation of an embodiment of the propulsion unit 3. In some embodiments, the blades 33 are set at a blade angle 332 in relation to extension 32. In some embodiments, the blades 33 will encounter the substantially linear fluid flow at the blade angle 332. In some embodiments, the blade angle 332 is set to 45 degrees, and the blades 33 will encounter the substantially linear fluid flow at a 45-degree angle. In some embodiments, the blades 33 are planar; in other embodiments, the blades 33 have a non-planar shape. In some embodiments, the blades 33 are all the same shape; however, in other embodiments, all blades 33 do not have the same shape.

FIG. 3E illustrates an embodiment of the propulsion unit 3. In some embodiments, the extension 32 comprises a disk that extends from the motor engagement section 34 to the blades 33. In some embodiments, the one or more blades 33 comprise one or more blade vectoring elements 331 that can change the angle of the leading edge or the trailing edge of the blade 33.

One of the benefits of electrical motors is the low-end torque they can exert, while one of the drawbacks of those same electrical motors is the energy required for high-end speed. Thus, one advantage of the extension 32 and the blades 33, located a distance away from the motor 31, allows the propulsion unit 3 to utilize the advantages of a motor 31 that is electric. The distance away from the motor 31 will increase the speed of the blades 33 in relation to the motor 31, and it will increase the torque required to move the motor engagement section 34. Thus, it uses the extension 32 as a means to employ the torque as a means to increase speed. The extension 32 exploits the ability of an electric motor to exert a large amount of torque at lower speeds. Also, as stated above, the location of the bearing 35, being so close to the center, allows for slower rotation of the balls 351.

FIG. 4A illustrates an embodiment of the PPS 2 comprising an intake section 21 and an output section 22 that are coupled together. In some embodiments, the intake section 21 and the output section 22 share parts, are integral, separate from each other, coupled together and/or electrically coupled. In some embodiments, the intake section 21 comprises intake vanes 231. In some embodiments, the intake vanes 231 are very similar to the output vanes 241. In some embodiments, the intake vanes 231 are situated such that there is no way for fluid to flow straight through the intake section 21. The fluid will have to alter its course to some degree as it flows through the intake vanes 231. There is an intake input edge tangent, and in some embodiments, the intake input edge tangent is set to, or about, 90 degrees relative to the exit plane. There is also an intake trailing edge tangent, and in some embodiments, the intake trailing edge tangent is set to, or about, 45 degrees relative to the intake plane. In some embodiments, the intake vanes 231 define a shape where the intake vane 231 near the entry is thicker than at the output. In some embodiments, the intake vanes 231 define a substantially curved tear-drop shape cross-section.

In some embodiments, the intake vanes 231 and the output vanes 241 are a reflection of each other, as if they were flipped 180 degrees. In some embodiments, as can be seen, when the fluid exits the intake vanes 231, the fluid is directed in a direction, at least partially, that the blades 33 rotate. Further, the output vanes 241 are angled in a direction, at least partially, opposite to the blades 33 rotate. It is believed that the shape and angle of the output vanes 241 and or the intake vanes 231 will help reduce or cancel the torque created by the rotation of the blades 33.

In some embodiments, as the propulsion unit 3 operates, fluid is drawn in through the intake section 21 and out the output section 22 by the blades 33. In some embodiments, the fluid will be drawn through the intake vanes 231, out the output vanes 241, or both. In some embodiments, the fluid will be directed from a perpendicular flow, entering the intake section 21, to a relative angled flow, exiting the intake section 21; an angled flow, entering the output section 22, to a perpendicular flow, exiting the output section 22; or both as shown in FIG. 4B.

In some embodiments, the intake vanes 231, the output vanes 241, the blades 33, or a combination thereof, are able to rotate to the desired angle.

Some embodiments comprise an enhanced torque cancellation. As shown in FIG. 4A, the intake section 21 and the output section 22, through the intake vanes 231 and output vanes 241, which act to straighten both intake and exit fluid flow. While output vanes 241 cancel exiting air circulation, intake vanes 231 prevent incoming air circulation. In combination or separately, the intake section 21 and the output section 22 act to reduce or cancel the total air torque and can produce a uniform outward thrust. The use of the intake vanes 231 and output vanes 241 can help achieve true torque cancellation. The use of the intake vanes 231, as opposed to just the use of the output vanes 241, may increase the torque cancellation. Stronger incoming air circulation can occur if only the output vanes 241 are used, reducing the torque cancellation of the PPS 2. In some embodiments, the intake vanes 231 and output vanes 241, while in a different orientation, are of the differing or same size and/or shape. In some embodiments, one or more of the intake vanes 231, one or more of the output vanes 241, or a combination thereof are of a differing shape or size from the other intake vanes 231 and/or output vanes 241. In some embodiments, additional set, or sets, of vanes are located in the intake section 21, output section 22, or a combination thereof.

It is believed that the proper cancelation of torque of the PPS 2 would improve efficiency considerably. It is well-known that about 30% of power is lost in the booms of traditional helicopters. Similar losses are expected in modern multi-copter, although their opposing rotating propellers cancel each other's torque. However, power loss occurs in the opposing airflow rotations.

A further benefit of torque cancellation is less acoustic noise. Energy loss in circulating air contributes much to audible noise, so the non-circulating fluid flow in this would generate less noise. In some embodiments, the PPS 2 will comprise sound-absorbing materials designed to absorb and dissipate sound power at the frequencies of generated noise. Furthermore, the intake section 21, the output section 22, the intake cover 210, or a combination thereof, reduce lateral noise emissions.

In some embodiments of the VTOL 70, the loudest noise is generated during lift-off and landing, and the torque cancelation and/or the sound-absorbing materials will reduce the peak noise level in the vicinity of the VTOL's 70 takeoff and landing sites. These noise reduction benefits can be significant for acoustic comfort, and regulatory requirements that VTOL 70 should not generate more than certain noise levels in residential areas. These materials can also be used in different embodiments, parts, and locations of the PPS 2.

Some embodiments of the PPS 2 use dual peripheral anti-rotating propulsion units 3.

In some embodiments, the PPS 2 comprises a mechanism such as a swash plate used in traditional helicopters to enable propeller pitch control to vary lift force.

In some embodiments of the VTOL 70, a payload module is mounted to the PPS 2. In some embodiments where the payload is located below the PPS 2 and sized such that the payload module has a smaller diameter than the extension 32, the payload will not block the fluid flow from the PPS 2.

In some embodiments, the VTOL 70 comprises a parachute. In some embodiments, the parachute is coupled to the personnel section 1. In some embodiments, the personnel section 1 is detachable from the remainder of the VTOL 70, reducing weight and allowing for more support from a parachute if deployed. One advantage that the VTOL 70 has, by having the PPS 2 located below the personnel section 1, the parachute is free from possible interference by the propulsion unit 3. In other designs, a deployed parachute may interact with propellors above the personnel compartment.

Figure 5:
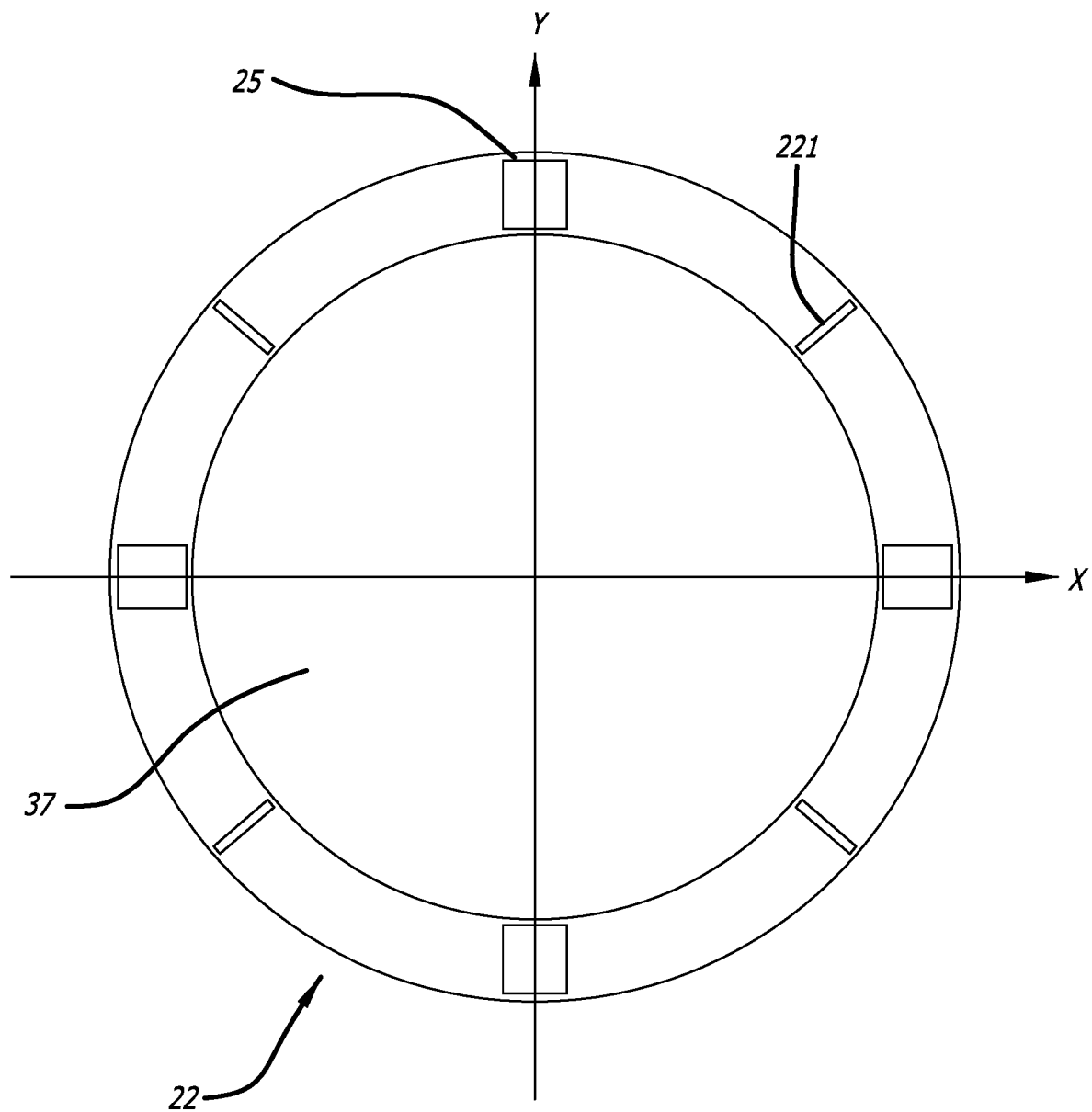
FIG. 5 shows an embodiment of the throttles and vectoring elements.

FIG. 5 illustrates an embodiment comprising four output throttles 25. The output throttles 25 work in conjunction to limit the fluid flow out of the output section 22 in certain areas to allow for directional control. In some embodiments, there are three output throttles 25; in some, there are four or more.

In some embodiments, the propulsion control or assistance thereof is done by the output throttles 25. In some embodiments, the output throttles 25 will control the direction or assist in directing the vehicle (e.g., VTOL 70, aircraft 71, submarine 72, watercraft 73). The three or more output throttles 25 allow for two-dimensional directional control and stabilization. In some embodiments, the output vane vectoring elements 2410, are only coupled to one or more the throttle vanes 242, which can provide further control of direction, rotation, and/or torque cancellation. Having control in an x-y axis allows full two-dimensional operation. In some embodiments, output throttles 25, or the outputs thereof, are positioned at the periphery of the PPS 2, and away from its center of gravity. In some embodiments, the output throttles 25, and their positioning can provide the ability to maintain stability during lift-up, flight, and landing of the VTOL 70. It is understood that one or more of the output vanes 241 can comprise output vane vectoring elements 2410. It is understood that all the vectoring elements (e.g., output vane vectoring elements 2410, blade vectoring elements 331, etc.) can act in unison, in different groups, or independently.

Figure 6A:
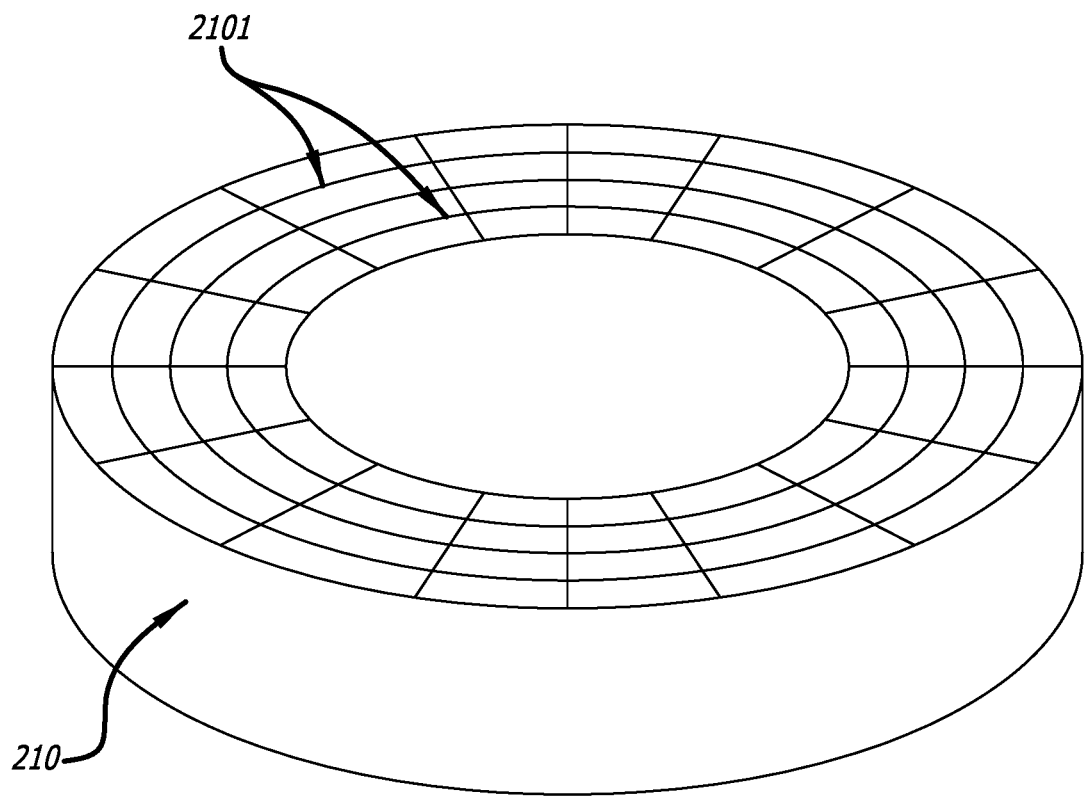
FIG. 6A shows an embodiment of an intake cover.
Figure 6B:
FIG. 6B shows an embodiment of intake grille vanes.

FIG. 6A illustrates an embodiment of an intake cover 210. In some embodiments, the intake cover 210 will be located above the intake section 21. In some embodiments, the intake cover 210 comprises an intake cover grille 2101. In some embodiments, the intake cover grille 2101 will prevent items of varying sizes from entering the intake section 21, and the effective opening sizes can be varied as desired. In some embodiments, the intake cover 2010 comprises intake grille vanes 2102. In some embodiments, the intake grille vanes 2102 are configured to straighten the fluid flow entering the intake section 21. In some embodiments, the tear-drop shape will reduce fluid flow resistance and reduce turbulent flow generation by the fluid flowing through the intake grille vanes 2102, reducing noise and/or increasing efficacy. In some embodiments, the intake grille vanes 2102 define a tear-drop shape cross-section. In some embodiments, the intake grille vanes 2102 will straighten the fluid flow while preventing items of a certain size from entering the intake section 21. In some embodiments, the PPS 2 comprises two intake covers 210 located on either side of the PPS 2. In some embodiments, the intake grille vanes 2102 can rotate to any desired angle.

Figure 7A:
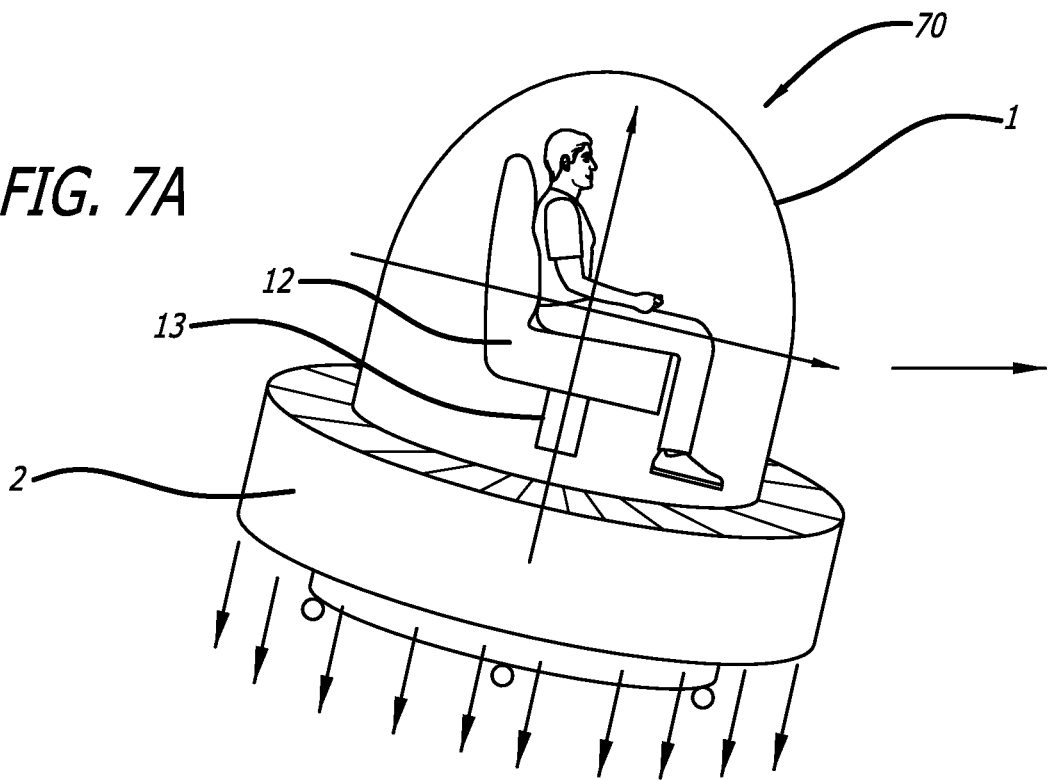
FIG. 7A shows an embodiment of a VTOL with an embodiment of a PPS.

FIG. 7A illustrates an embodiment of the VTOL 70 in use. After initial lift-up and levitation in the air, the whole VTOL 70 could tilt forward to allow horizontal forward flight. This way, air thrust would support the weight of the VTOL 70 and provide the forward propulsion force.

Figure 7B:
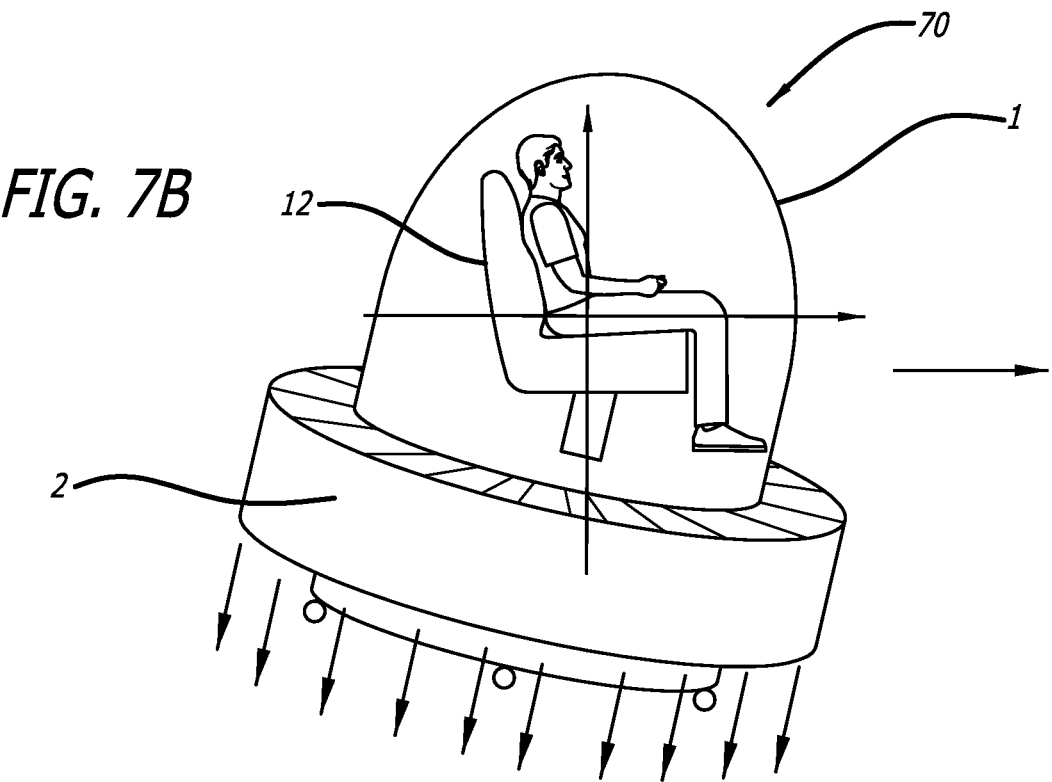
FIG. 7B shows an embodiment of a VTOL with an embodiment of a PPS.

FIG. 7B illustrates an embodiment of the VTOL 70 in use and having a chair 12 that will allow the user to remain vertical or substantially vertical during flight. In some embodiments, the user will be able to fix the chair 12 or allow for gyroscopic movement and maintain position in relation to the horizon. This could give a better travel experience and a better view of the surroundings. Any front display or console could also follow the passenger's gyroscopic movement as well. In some embodiments, the amount of movement can be limited to allow for user feedback as to the flight of the VTOL 70.

Figure 8A:
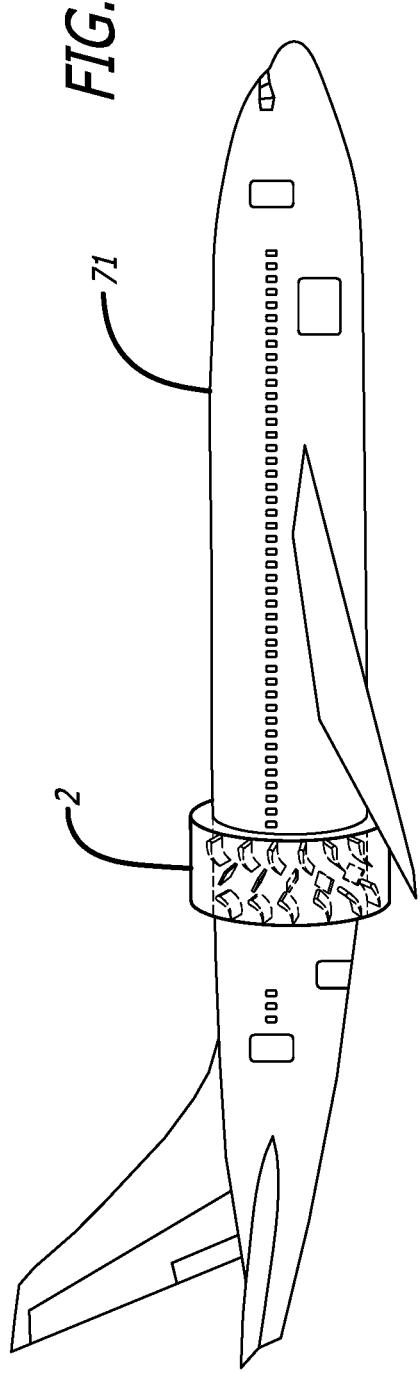
FIG. 8A shows an embodiment of an aircraft with an embodiment of a PPS.
Figure 8B:
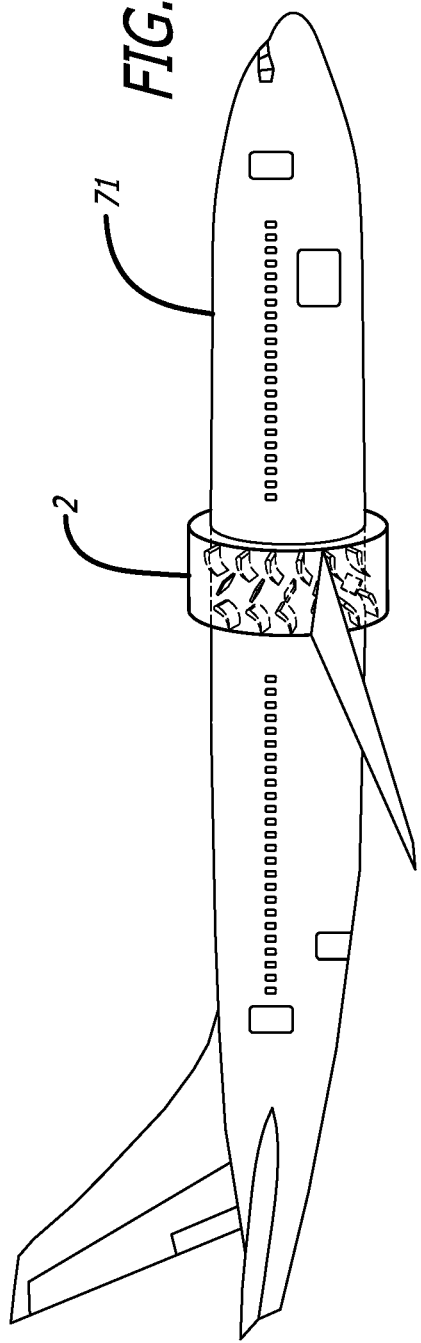
FIG. 8B shows an embodiment of an aircraft with an embodiment of a PPS.
Figure 8C:
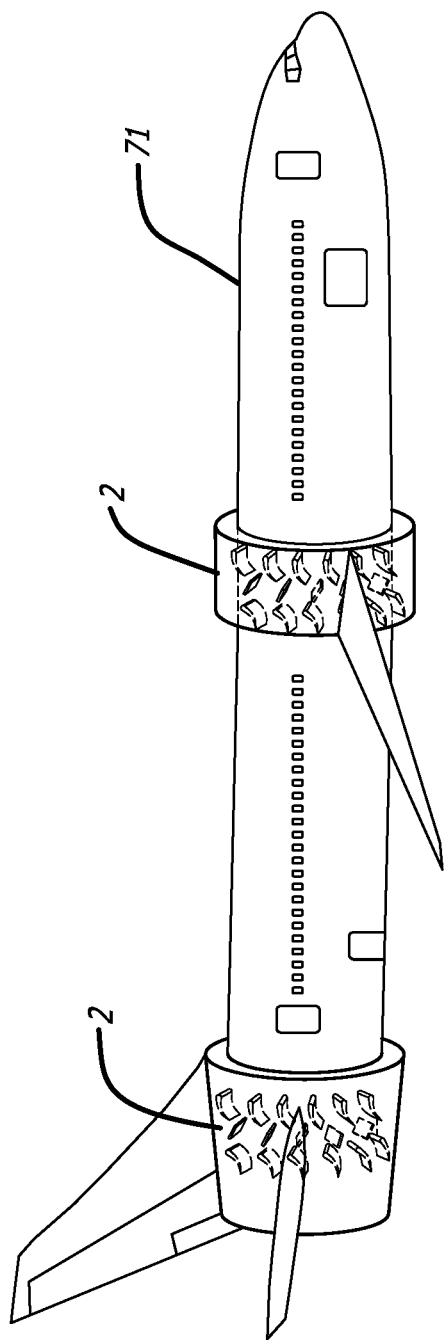
FIG. 8C shows an embodiment of an aircraft with embodiments of PPS.

FIGS. 8A, 8B, and 8C illustrate one or more PPS 2 used to propel an aircraft 71. The PPS 2 can be located about the center of the aircraft 71, between the wing and the tail, and/or on the tail. In some embodiments, the PPS 2 is tapered. In some embodiments, the PPS 2 can be tapered to better allow for takeoff and landing. In some embodiments, the PPS 2 would divide the cabin into two sections.

Figure 8D:
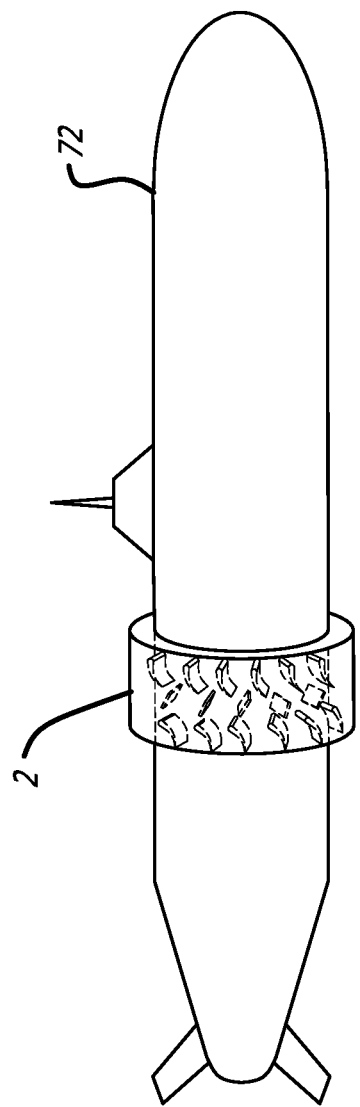
FIG. 8D shows an embodiment of a submarine with an embodiment of a PPS.

FIG. 8D illustrates a submarine 72 comprising a PPS 2.

FIG. 8E illustrates a watercraft 73 comprising a PPS 2.

FIG. 8F illustrates an enclosed transport vehicle 74 comprising a PPS 2. In some embodiments, the enclosed transport vehicle 74 is a vactrain. In some embodiments, wheels, rails, or a magnetic levitation/drive could be used. The movement could be bidirectional, and only the direction of rotation of the motor 31 needs to be reversed and/or the angle of the blades 33. In some embodiments, the blades 33, the intake vanes 231, the output vanes 241, the intake grille vanes 2102, or a combination thereof can also be rotated as desired and/or for a reverse operation. In some embodiments, the PPS 2 comprises two intake covers 210 located on both sides of the PPS 2.

In some embodiments, the VLOT 70 is a remote vehicle, comprises a camera, a self-guidance system, a package delivery system, or a combination thereof. It is understood that in some embodiments, the VTOL 70 is a remote delivery vehicle configured to transport packages from one location to another.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however, it is disclosed that elements of disclosed embodiments can be switched with corresponding elements of embodiments with the same name and/or number of other disclosed embodiments.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An apparatus comprising:
 a vehicle; and
 a peripheral propulsion system coupled to the vehicle, wherein the peripheral propulsion system comprises:
  a propulsion unit, wherein the propulsion unit comprises:
   a motor;
   a motor engagement section;
   an extension coupled to the motor engagement section; and
   two or more blades coupled to the extension;
  an upper section and a lower section, wherein the extension is located between the upper section and the lower section; and
  an output section located about at least a portion of the lower section;
 wherein the two or more blades are located outside a periphery of the vehicle; the upper section is located below the vehicle; the motor supports a weight of the vehicle when located on a surface; and when the motor is running, the two or more blades are capable of drawing fluid from about the periphery of the vehicle and through the output section.

2. The apparatus of claim 1, wherein the propulsion unit further comprises an intake section located about at least a portion of the upper section; and the two or more blades are capable of drawing fluid from about the periphery of the vehicle, into the intake section, and out the output section.

3. The apparatus of claim 1, wherein the output section comprises output vanes.

4. The apparatus of claim 1, wherein the output section comprises three or more output throttles; and each output throttle is configured to selectively limit fluid flow between two throttle vanes.

5. The apparatus of claim 1, wherein the motor is a stator of an electric motor, and the motor engagement section is its external rotor.

6. The apparatus of claim 1, the motor is located between the upper section and the lower section.

7. The apparatus of claim 1, wherein the motor is located in the upper section or the lower section, the motor engagement section extends from the motor.

8. The apparatus of claim 1, wherein the vehicle is selected from a group consisting of a vertical takeoff and landing vehicle, a fixed-winged aircraft, a watercraft, a submersible watercraft, and a vactrain.

9. The apparatus of claim 1, wherein the motor is an electric motor.

10. The apparatus of claim 1, wherein the upper section comprises an intake cover, the intake cover comprises intake grill vanes, and the intake grill vanes define a tear-drop shape cross-section.

11. The apparatus of claim 1, wherein the vehicle comprises a chair, and the chair is capable of at least some gyroscopic movement.

12. The apparatus of claim 1, further comprising a parachute attached to the vehicle; wherein the peripheral propulsion system is selectively separable from the vehicle during operation.

13. An apparatus comprising:
a vehicle; and
a peripheral propulsion system coupled to the vehicle, wherein the peripheral propulsion system comprises:
  a propulsion unit, wherein the propulsion unit comprises:
    a motor;
    a motor engagement section;
    an extension coupled to the motor engagement section; and
    two or more blades coupled to the extension; and
  an upper section and a lower section, wherein the extension is located between the upper section and the lower section;
  wherein the extension is sized such that the two or more blades are located outside a periphery of the vehicle; the peripheral propulsion system is configured to direct fluid to a substantially perpendicular flow, after entering the intake section, to a relative angled flow as exiting the intake section; the peripheral propulsion system is further configured to direct an angled flow entering the output section to perpendicular flow exiting the output section; and the relative angled flow as exiting the intake section is angled in a direction of the one or more blades rotation.

14. The apparatus of claim 13, wherein the propulsion unit further comprises an output section located about at least a portion of the lower section, and an intake section located about at least a portion of the upper section; and the two or more blades are capable of drawing fluid from about the periphery of the vehicle, into the intake section, and out the output section.

15. The apparatus of claim 13, wherein the propulsion unit further comprises an output section located about at least a portion of the lower section, and the output section comprises output vanes.

16. The apparatus of claim 13, wherein the propulsion unit further comprises an output section located about at least a portion of the lower section, and the output section comprises three or more output throttles; and each output throttle is configured to selectively limit fluid flow between two throttle vanes.

17. The apparatus of claim 13, wherein the motor is a stator of an electric motor, and the motor engagement section is its external rotor.

18. The apparatus of claim 13, wherein the motor engagement section is integral with the extension.

19. The apparatus of claim 13, the motor is located between the upper section and the lower section.

20. The apparatus of claim 13, wherein the motor is located in the upper section or the lower section, the motor engagement section extends from the motor.

21. The apparatus of claim 13, wherein the vehicle is selected from a group consisting of a vertical takeoff and landing vehicle, a fixed-winged aircraft, a watercraft, a submersible watercraft, and a vactrain.

22. The apparatus of claim 13, wherein the motor is an electric motor.

23. The apparatus of claim 13, wherein the upper section comprises an intake cover, the intake cover comprises intake grill vanes, and the intake grill vanes define a tear-drop shape cross-section.

24. The apparatus of claim 13, wherein the vehicle comprises a chair, and the chair is capable of at least some gyroscopic movement.

25. The apparatus of claim 13, further comprising a parachute attached to the vehicle; wherein the peripheral propulsion system is selectively separable from the vehicle during operation.

26. An apparatus comprising:
a vehicle; and
a peripheral propulsion system coupled to the vehicle, wherein the peripheral propulsion system comprises:
  a propulsion unit, wherein the propulsion unit comprises:
    a motor;
    a motor engagement section;
    an extension coupled to the motor engagement section;
  an upper bearing;
  a lower bearing; and
  two or more blades coupled to the extension; and
  an upper section and a lower section, wherein the extension is located between the upper section and the lower section;
  wherein the two or more blades are capable of drawing fluid from about a periphery of the vehicle and pushing fluid out about the periphery of the vehicle; and the upper bearing is located between the upper section and the motor engagement section, and the lower bearing located between the lower section and the motor engagement section.

27. The apparatus of claim 26, wherein the propulsion unit further comprises an output section located about at least a portion of the lower section, and an intake section located about at least a portion of the upper section; and the two or more blades are capable of drawing fluid from about the periphery of the vehicle, into the intake section, and out the output section.

28. The apparatus of claim 26, wherein the propulsion unit further comprises an output section located about at least a portion of the lower section, and the output section comprises output vanes.

29. The apparatus of claim 26, wherein the propulsion unit further comprises an output section located about at least a portion of the lower section, and the output section comprises three or more output throttles; and each output throttle is configured to selectively limit fluid flow between two throttle vanes.

30. The apparatus of claim 26, wherein the motor is a stator of an electric motor, and the motor engagement section is its external rotor.

31. The apparatus of claim 26, the motor is located between the upper section and the lower section.

32. The apparatus of claim 26, wherein the motor is located in the upper section or the lower section, the motor engagement section extends from the motor.

33. The apparatus of claim 26, wherein the vehicle is selected from a group consisting of a vertical takeoff and landing vehicle, a fixed-winged aircraft, a watercraft, a submersible watercraft, and a vactrain.

34. The apparatus of claim 26, wherein the motor is an electric motor.

35. The apparatus of claim 26, further comprising a parachute attached to the vehicle; wherein the peripheral propulsion system is selectively separable from the vehicle during operation.

36. The apparatus of claim 26, wherein the vehicle comprises a chair, and the chair is capable of at least some gyroscopic movement.

37. The apparatus of claim 26, wherein the upper section comprises an intake cover, the intake cover comprises intake grill vanes, and the intake grill vanes define a tear-drop shape cross-section.

\* \* \* \* \*